United States Patent
Jung et al.

(10) Patent No.: US 12,035,276 B2
(45) Date of Patent: Jul. 9, 2024

(54) METHOD AND APPARATUS FOR PAGING RESPONSE IN WIRELESS COMMUNICATION SYSTEM

(71) Applicant: LG ELECTRONICS INC., Seoul (KR)

(72) Inventors: Sunghoon Jung, Seoul (KR); Sangwon Kim, Seoul (KR); Hongsuk Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 448 days.

(21) Appl. No.: 17/450,748

(22) Filed: Oct. 13, 2021

(65) Prior Publication Data
US 2022/0116909 A1  Apr. 14, 2022

(30) Foreign Application Priority Data
Oct. 14, 2020  (KR) .................... 10-2020-0132551

(51) Int. Cl.
| | |
|---|---|
| *H04W 68/00* | (2009.01) |
| *H04W 72/23* | (2023.01) |
| *H04W 74/0833* | (2024.01) |
| *H04W 76/10* | (2018.01) |

(52) U.S. Cl.
CPC ......... *H04W 68/005* (2013.01); *H04W 72/23* (2023.01); *H04W 74/0833* (2013.01); *H04W 76/10* (2018.02)

(58) Field of Classification Search
CPC ... H04W 68/005; H04W 76/10; H04W 72/23; H04W 74/0833
See application file for complete search history.

(56) References Cited

U.S. PATENT DOCUMENTS

| | | | |
|---|---|---|---|
| 2007/0259675 A1* | 11/2007 | Worrall | H04W 68/02 455/458 |
| 2013/0064202 A1* | 3/2013 | Zhang | H04W 72/23 370/329 |
| 2018/0199309 A1* | 7/2018 | Islam | H04B 7/0619 |
| 2018/0270791 A1* | 9/2018 | Park | H04W 8/24 |
| 2018/0270792 A1* | 9/2018 | Park | H04W 68/025 |
| 2018/0270894 A1* | 9/2018 | Park | H04W 36/02 |
| 2019/0230624 A1* | 7/2019 | Islam | H04W 68/02 |
| 2022/0116909 A1* | 4/2022 | Jung | H04W 74/0833 |
| 2023/0037983 A1* | 2/2023 | Catovic | H04L 5/0005 |

\* cited by examiner

*Primary Examiner* — Adam D Houston
(74) *Attorney, Agent, or Firm* — LEE, HONG, DEGERMAN, KANG & WAIMEY

(57) ABSTRACT

The present disclosure relates to a paging response in wireless communications. According to an embodiment of the present disclosure, a wireless device may perform a UL transmission for informing that the wireless device does not respond to a paging from a first network to the first network, while communicating with the first network. The UL transmission is related to the ID of the wireless device among a list of IDs of the wireless devices in the paging.

18 Claims, 19 Drawing Sheets

METHOD AND APPARATUS FOR PAGING RESPONSE IN WIRELESS COMMUNICATION SYSTEM

CROSS-REFERENCE TO RELATED APPLICATIONS

Pursuant to 35 U.S.C. § 119 (a), this application claims the benefit of an earlier filing date and right of priority to Korean Patent Application No. 10-2020-0132551, filed on Oct. 14, 2020, the contents of which is hereby incorporated by reference herein in its entirety.

BACKGROUND OF THE DISCLOSURE

Field of the Disclosure

The present disclosure relates to a paging response in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

A user equipment (UE) may be equipped with multiple universal subscriber identity modules (USIMs). Such UE may be called a multiple USIM (MUSIM) UE. The MUSIM UE may register to multiple networks associated with the MUSIM, including a first network and a second network.

While maintaining a connection with the first network, the MUSIM UE may receive a paging from the second network. In some cases, the MUSIM UE may send a paging response for the paging from the second network.

SUMMARY OF THE DISCLOSURE

Technical Problem

An aspect of the present disclosure is to provide method and apparatus for a paging response in a wireless communication system.

Another aspect of the present disclosure is to provide method and apparatus for a paging response in MUSIM operations in a wireless communication system.

Yet another aspect of the present disclosure is to provide method and apparatus for a busy indication in MUSIM operations in a wireless communication system.

Technical Solution

According to an embodiment of the present disclosure, a method performed by a wireless device in a wireless communication system comprises: receiving, from a first network, a paging including an identifier (ID) of the wireless device while communicating with a second network; and performing an uplink (UL) transmission for informing that the wireless device does not respond to the paging from the first network, to the first network. The UL transmission is related to the ID of the wireless device among a list of IDs of the wireless devices in the paging.

According to an embodiment of the present disclosure, a wireless device in a wireless communication system comprises: a transceiver; a memory; and at least one processor operatively coupled to the transceiver and the memory, and configured to: control the transceiver to receive, from a first network, a paging including an identifier (ID) of the wireless device; and control the transceiver to perform an uplink (UL) transmission for informing that the wireless device does not respond to the paging from the first network, to the first network. The UL transmission is related to the ID of the wireless device among a list of IDs of the wireless devices in the paging.

According to an embodiment of the present disclosure, a method performed by a base station (BS) in a first network in a wireless communication system comprises: transmitting, to a wireless device, a paging including an identifier (ID) of the wireless device; receiving, from the wireless device, a random access preamble for informing that the wireless device does not respond to the paging; and stopping transmitting a paging including the ID of the wireless device. The random access preamble is related to the ID of the wireless device among a list of IDs of wireless devices in the paging.

Advantageous Effect

The present disclosure can have various advantageous effects.

For example, the busy indication indicating that the UE determines not to respond to the paging message can be transmitted as fast as possible with low complexity, without service interruption and/or signalling overhead.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
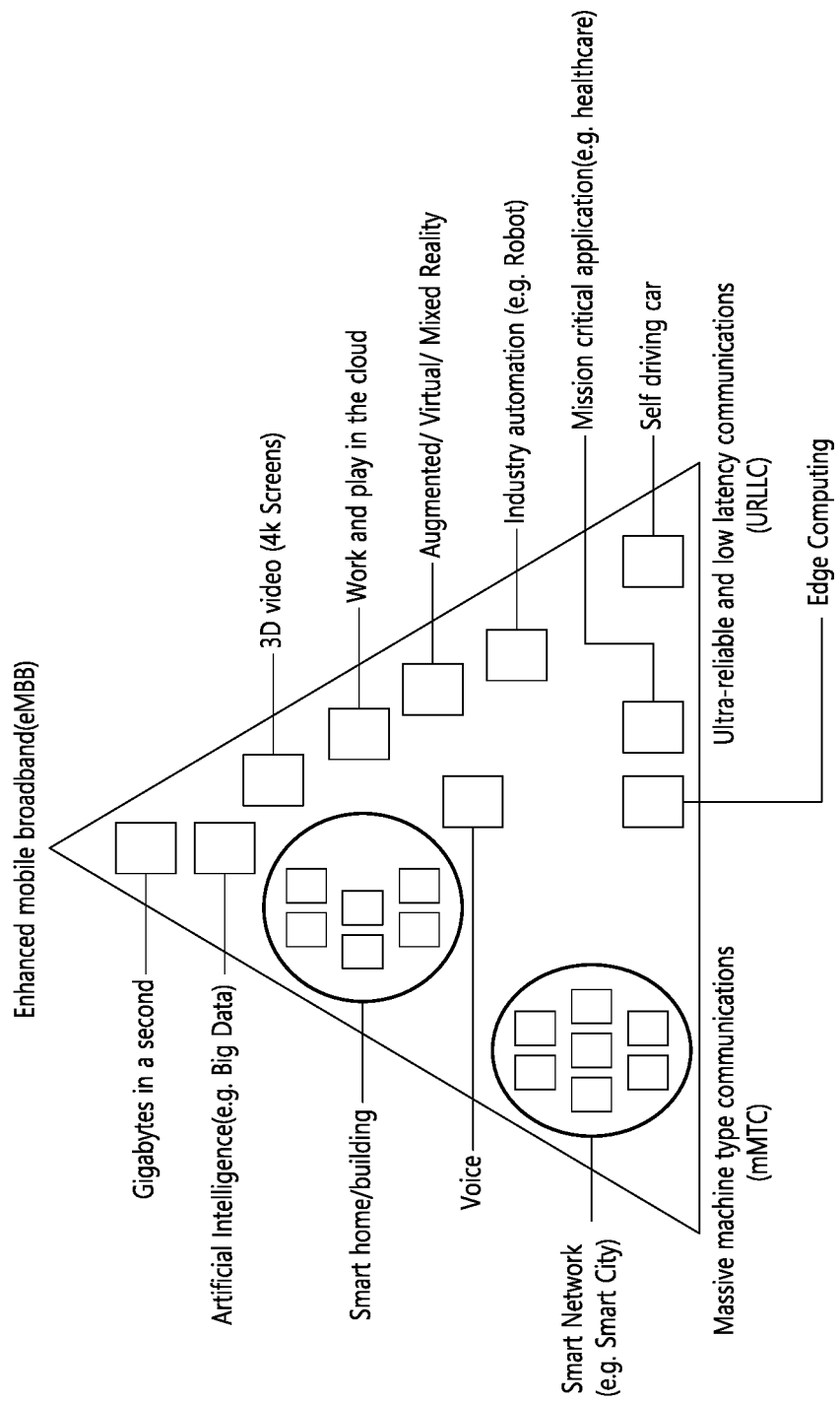
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC)

area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency designation Range | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
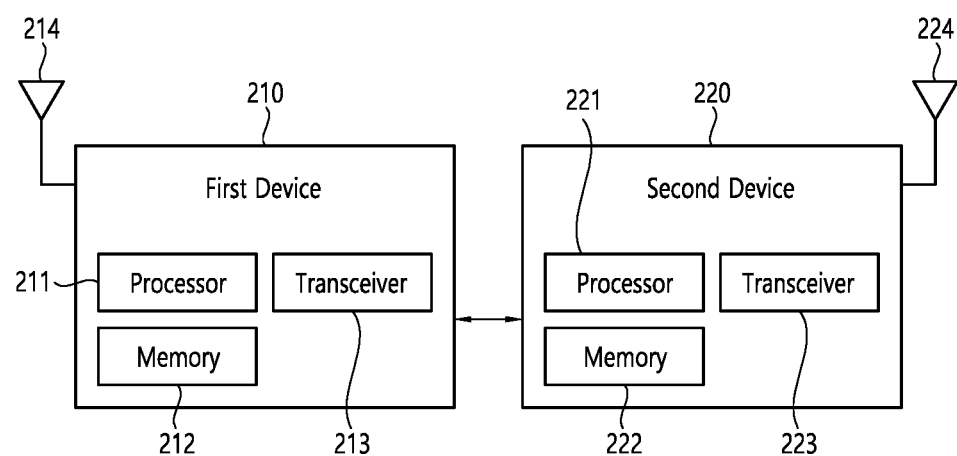
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
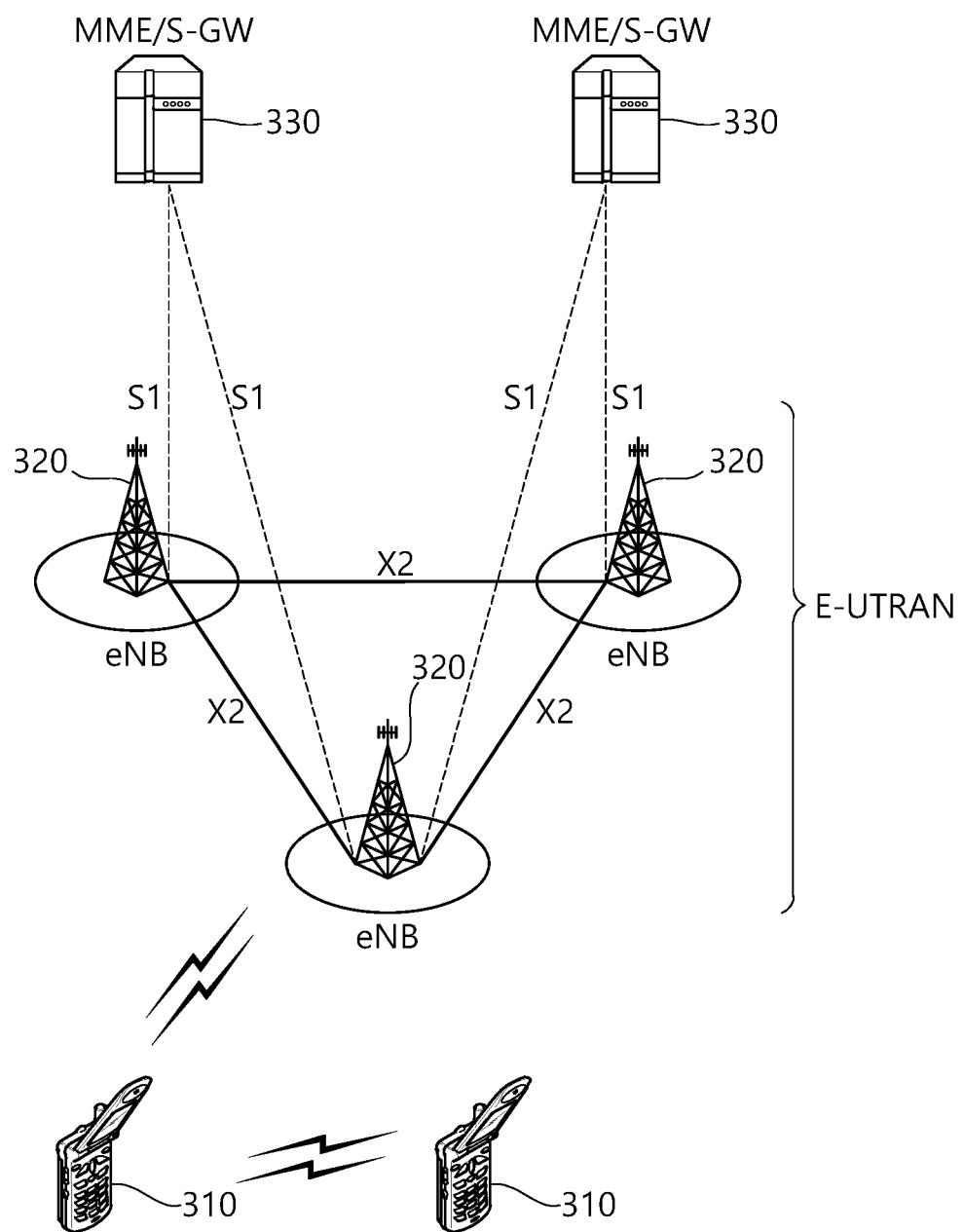
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
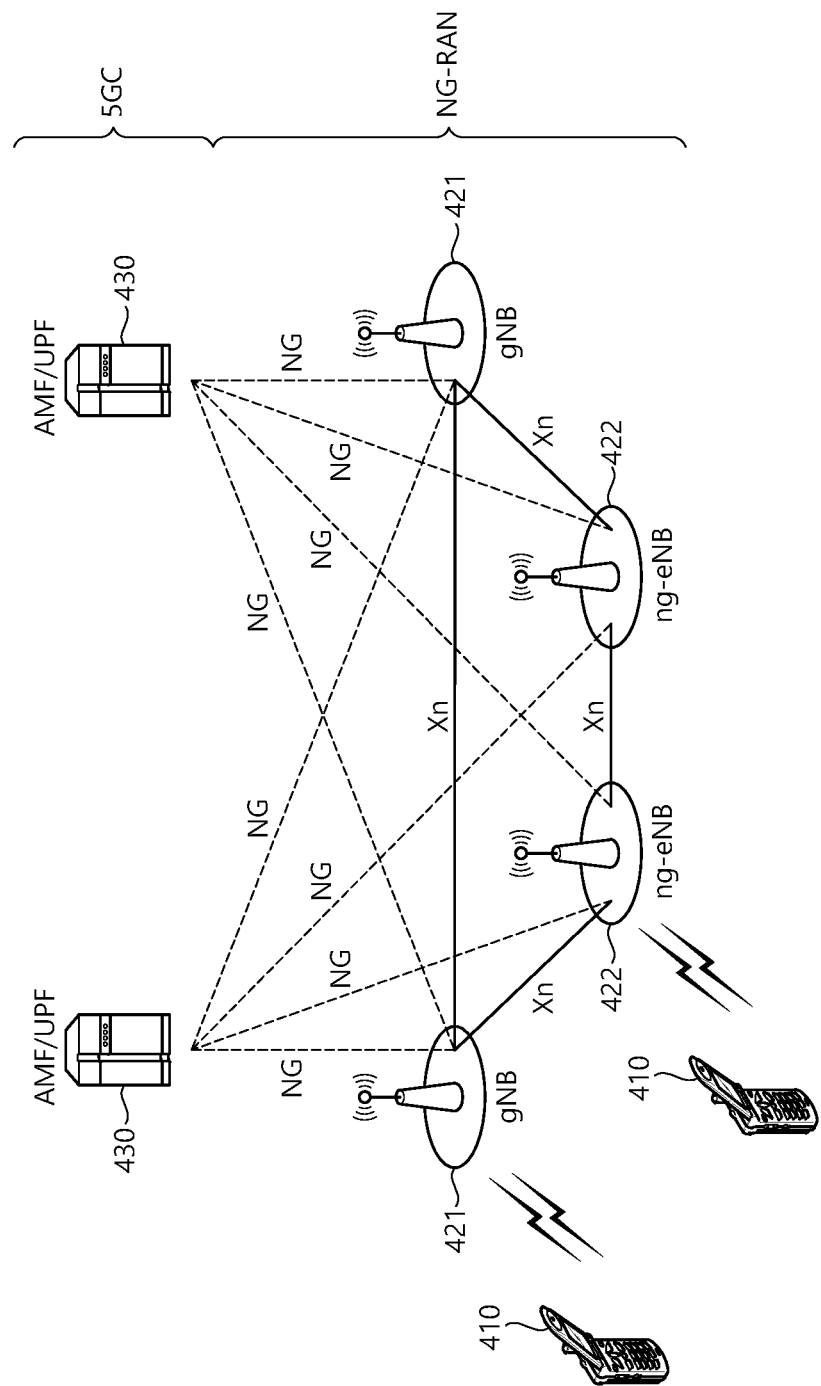
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
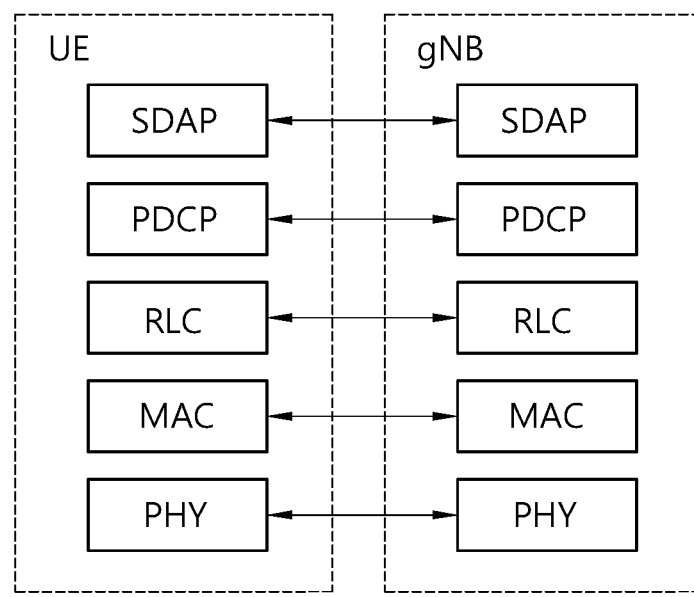
FIG. 5 shows a block diagram of a user plane protocol stack to which the technical features of the present disclosure can be applied.
Figure 6:
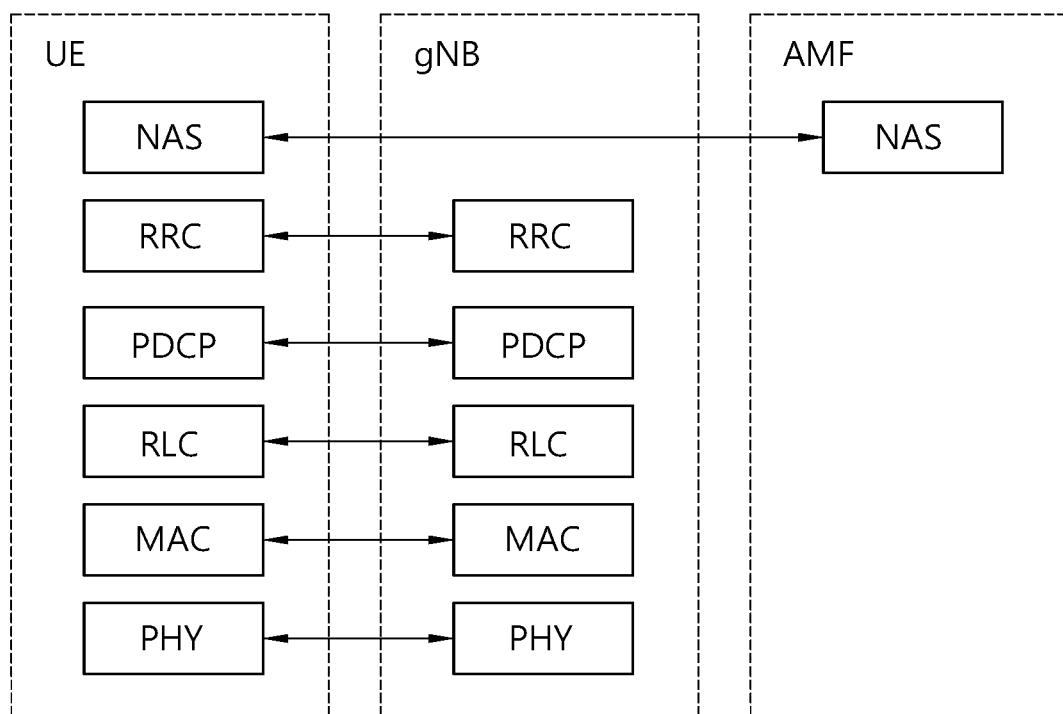
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARD), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
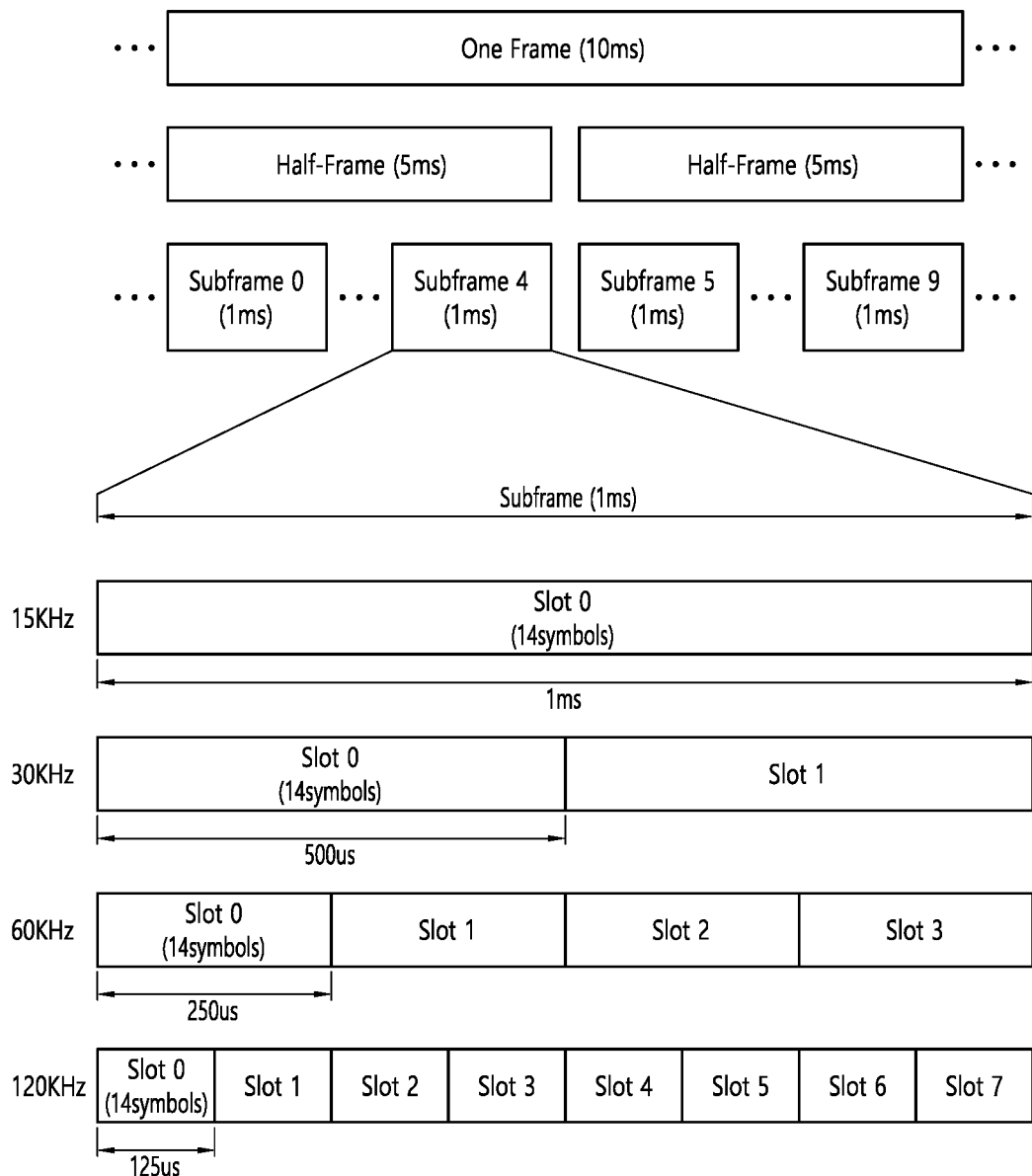
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2u*15$ kHz. The following table shows the number of OFDM symbols per slot, the number of slots per frame, and the number of slots per for the normal CP, according to the subcarrier spacing $\Delta f=2u*15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f=2u*15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
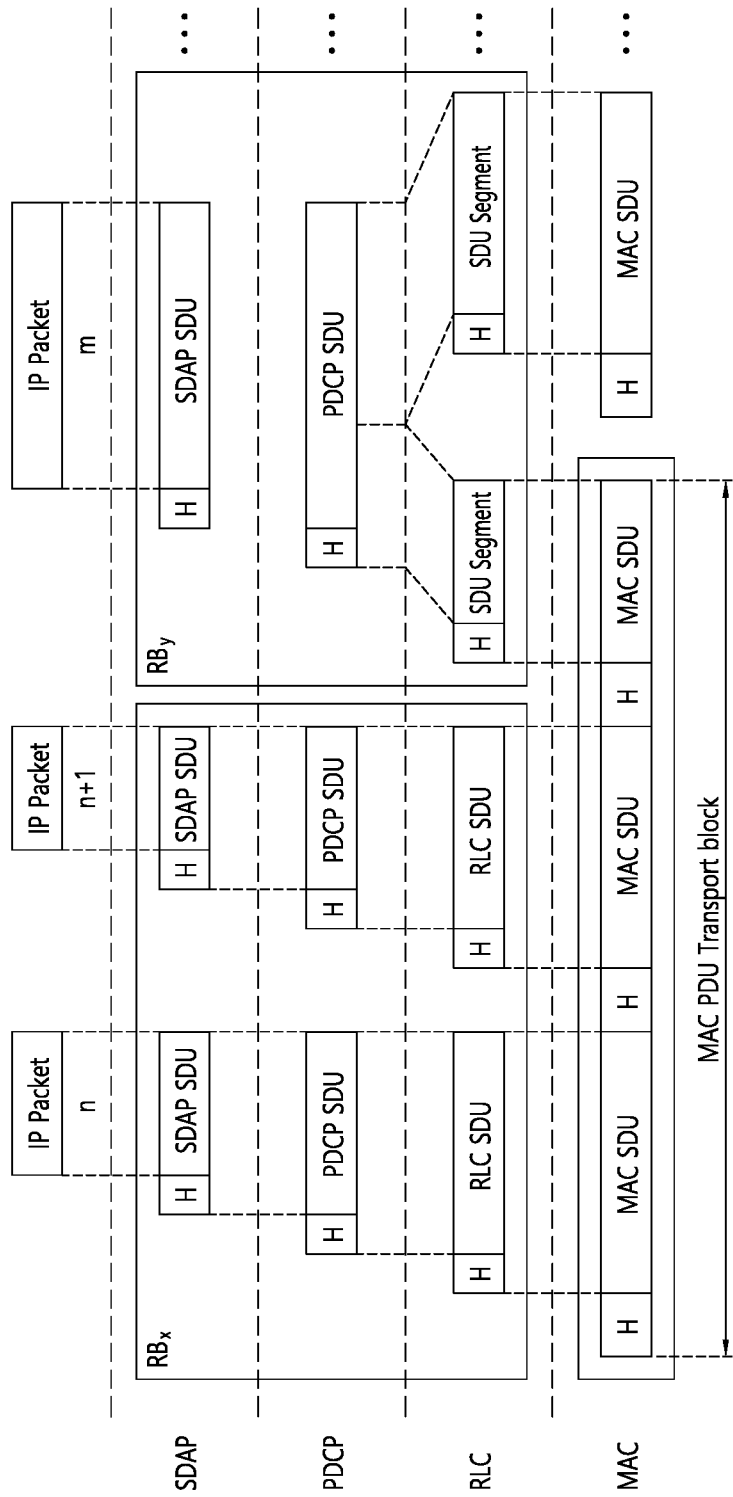
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Hereinafter, discontinuous reception (DRX) for paging is described.

A UE may use DRX in RRC_IDLE and RRC_INACTIVE state in order to reduce power consumption. A DRX cycle may be periodically recurred, and comprise a DRX ON duration in which the UE wakes up to monitor a paging, and a DRX OFF duration in which the UE sleeps not to monitor a paging. Since the DRX cycle is periodically recurred, the DRX ON duration and the DRX OFF duration may also be periodically recurred according to the DRX cycle. The UE may monitor one paging occasion (PO) per DRX cycle. A PO is a set of PDCCH monitoring occasions and can consist of multiple time slots (e.g., subframe or OFDM symbol) where paging DCI can be sent. One paging frame (PF) may be on radio frame and may contain one or more POs or starting point of a PO.

Hereinafter, contents related to a multi-universal subscriber identity module (MUSIM) is described.

Multi-USIM devices (e.g., MUSIM device 910) have been more and more popular in different countries. The user may have both a personal and a business subscription in one device or have two personal subscriptions in one device for different services.

Figure 9:
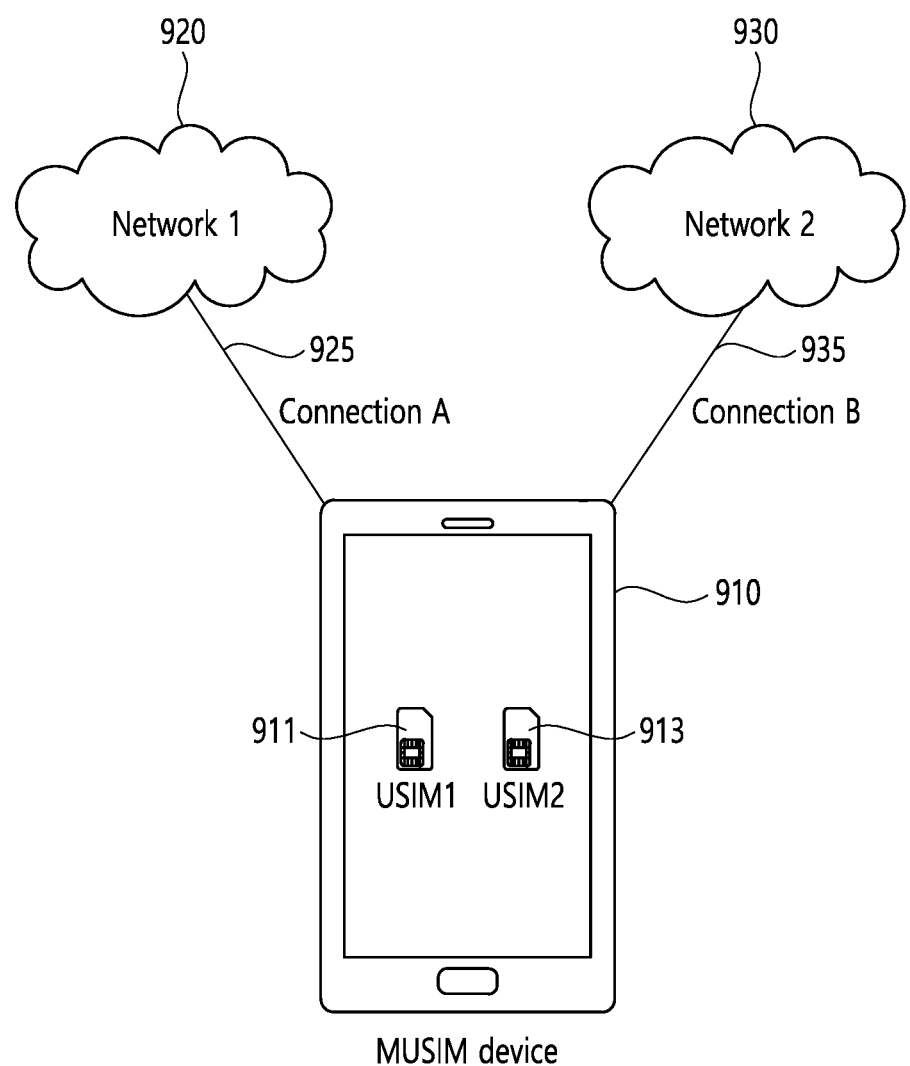
FIG. 9 shows an example of a wireless environment in which a MUSIM device operates according to an embodiment of the present disclosure.

FIG. 9 shows an example of a wireless environment in which a MUSIM device operates according to an embodiment of the present disclosure.

Referring to FIG. 9, MUSIM device 910 (or, MUSIM UE 910) may have a plurality of universal subscriber identity modules (USIMs)—USIM1 911 and USIM2 913. The MUSIM device 910 may register to a network 1 920 based on subscription information in the USIM1 911 to obtain a connection A 925 between the network 1 920 and the MUSIM device 910. The MSUIM device 910 may also register to a network 2 930 based on subscription information in the USIM2 913 to obtain a connection B 935 between the network 2 930 and the MUSIM device 910. The MUSIM device 910 may use the USIM1 911 to perform a communication with the network 1 920 over the connection A 925, and use the USIM2 913 to perform a communication with the network 2 930 over the connection B 935.

In a wireless environment in which a MUSIM device operates, the following properties may hold:

Each registration from the USIMS of a MUSIM device may be handled independently.

Each registered USIM in the MUSIM device may be associated with a dedicated international mobile equipment identity (IMEI)/permanent equipment identifier (PEI).

A MUSIM UE may be connected with i) evolved packet system (EPS) on one USIM and 5G system (5GS) on the other USIM; ii) EPS on both USIMs; or iii) 5GS on both USIMs.

A MUSIM UE may be a single reception (RX)/dual RX/single transmission (TX)/Dual TX UE. Single RX may allow the MUSIM UE to receive traffic from only one network at one time. Dual RX may allow the MUSIM UE to simultaneously receive traffic from two networks. Single TX may allow the MUSIM UE to transmit traffic to one network at one time. Dual TX may allow the MUSIM UE to simultaneously transmit traffic to two networks. The terms single RX/TX and Dual RX/TX do not refer to a device type. A single UE may, as an example, use Dual TX in some cases but Single TX in other case.

If/when the multiple USIMs in the MUSIM device are served by different serving networks, network coordination between the serving networks may not be required.

A MUSIM device with different USIMs may be camping with all USIMs on the same serving network RAN node, or the MUSIM device may be camping on different serving networks RAN nodes.

USIMs may belong to same or different operators. Coordination between involved operators may not be required.

USIM may be a physical SIM or embedded SIM (eSIM).

While actively communicating with a first system/network, a MUSIM UE may need to periodically monitor a second system/network (e.g. to synchronize, read the paging channel, perform measurements, or read the system information). The periodical activity on the second system may or may not have performance impact on the first system the UE is communicating with, depending on the UE implementation (i.e., single reception (Rx) or dual Rx).

In some cases, the UE equipped with different USIMs may have paging collisions which results in missed paging. When the UE receives a page in the second system while actively communicating with the first system, the UE may need to decide whether the UE should respond to this paging or not. When the UE decides to respond to the paging in the second system, the UE may need to stop the current activity in the first system. For example the first system may suspend or release the ongoing connection with the UE.

Hereinafter, busy indication as a paging response is described.

In some cases, MUSIM device may determine that the on-going connection in the other system is more important than the current system. MUSIM devices can efficiently perform activities (e.g., listen to paging, respond to paging, perform mobility update) in a system while communicating with another system. Responding to a paging may be important for the network, since responding to the paging would allow the network to save paging resources as a result of not escalating the paging across a larger area. For example, the UE may send a busy indication to the network as a response to the paging.

The MUSIM device may have two USIMs—USIM A and USIM B. Hereinafter, steps performed by the MUSIM device based on the USIM A may be described as being performed by UE A, and steps performed by the MUSIM device based on the USIM A may be described as being performed by UE B. The UE A may register to network A, and the UE B may register to network B.

The procedure "Busy indication as a paging response" with network B may be based on the periodic absence time with network A. The periodic absence time should be short enough and acceptable for the ongoing service associated with UE A in the MUSIM device.

The time spent for the procedure "Busy indication as a paging response" should be estimated to see whether the periodic absence time is enough to perform the procedure "Busy indication as a paging response".

When the UE A is in RRC_CONNECTED, the UE A may use implementation specific method to achieve a periodic absence in system A/network A or the UE A may request a periodic absence time in RAN serving the UE A. The absence time requested may coincide to when UE B (which is in RRC-IDLE or RRC-Inactive) monitors paging occasions. During the absence time, UE A may be still in RRC-CONNECTED, but may not need to e.g. monitor the control channel to detect whether downlink data is scheduled for delivery.

If UE B identity is not part of the paging message, UE B can go back to sleep.

If the UE B identity is part of the paging message, the MUSIM device may need to decide which communication is most important (UE A or UE B). This decision can be done based on implementation in the MUSIM device and may take into account e.g. an already ongoing high priority communication for UE A and/or if the UE B receives network assistance information when paged and other information.

If, at this moment, the MUSIM device decided not to setup the communication for UE B service since the ongoing communication on UE A is more preferred, UE B instead may send a NAS message to the network that the UE B is currently busy, e.g. a new cause value "busy" in the Service Request (e.g., busy indication). The RAN node may forward the NAS Service Request including the busy indication to the AMF using a N2 message.

When the AMF receives the cause value "busy", the AMF can stop paging the UE B and the corresponding paging escalation.

In case the UE B was in RRC-Inactive, then the RAN node will not need to forward the busy indication to the AMF.

The network may store the MT traffic until UE B connects.

Figure 10:
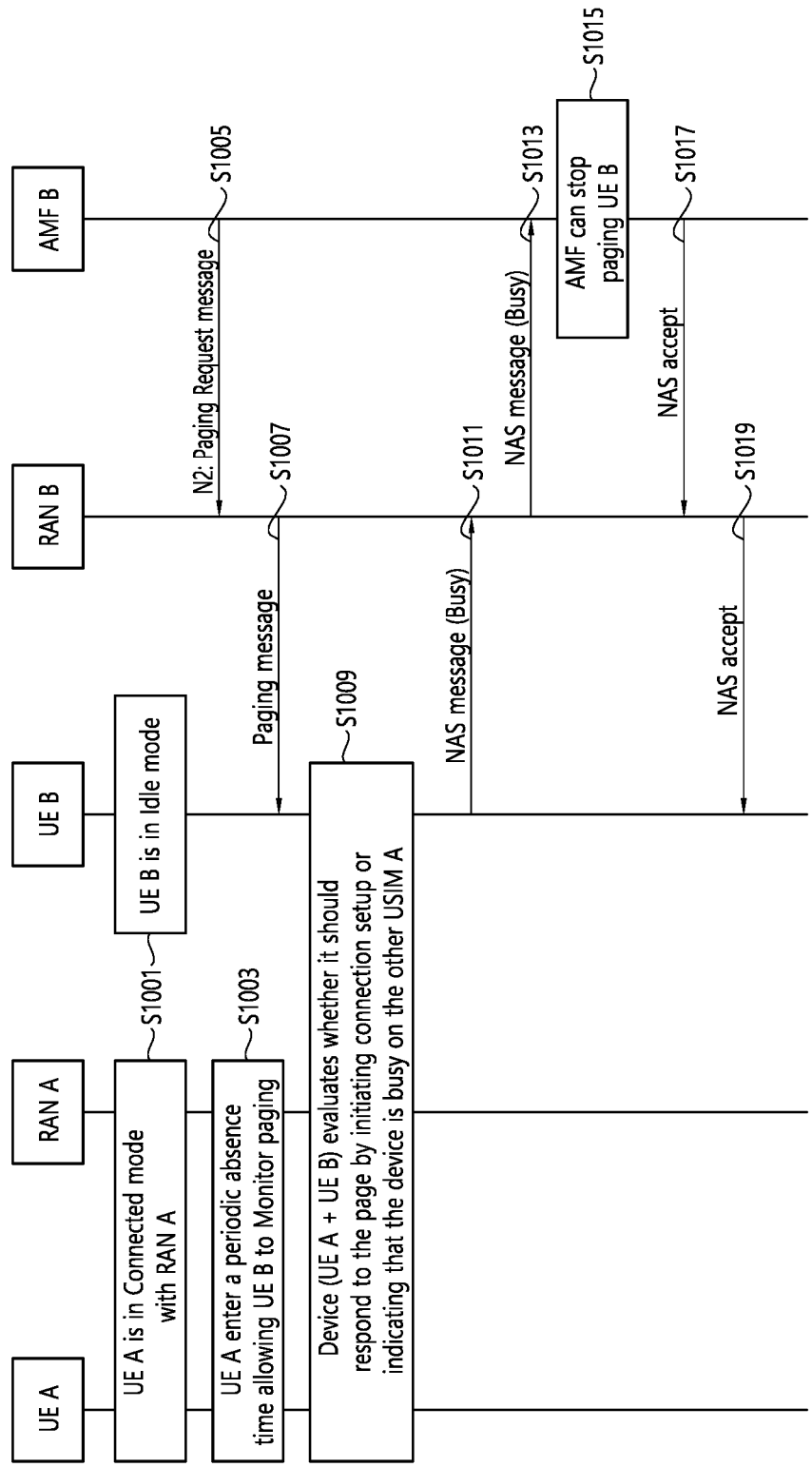
FIG. 10 shows an example of a procedure for busy indication as a paging response to which technical features of the present disclosure can be applied.

FIG. 10 shows an example of a procedure for busy indication as a paging response to which technical features of the present disclosure can be applied. In the procedure, it is assumed that UE A can pause an RRC-connection in a periodic manner allowing UE B to perform paging monitoring.

Referring to FIG. 10, in step S1001, a MUSIM device with two USIMs may have the following states—UE A may be in connected mode and UE B may be in idle mode. UE A may have negotiated a periodic absence time allowing the MUSIM device to perform activities related to other USIMs.

In step S1003, UE A may enter a periodic absence time that allows UE B to monitor a scheduled paging occasion and send a busy response/busy indication.

In step S1005, the AMF serving the UE B may send a N2 paging request message to RAN B.

In step S1007, RAN B may page UE B.

In step S1009, UE B may receive the page i.e. decode the paging message and the associated Network Assistance Information. The MUSIM device may evaluate which connection is more important. The decision may be based on implementation in the MUSIM device and may take into account the Network Assistance Information, what type of ongoing communication and/or other information.

In an example, the MUSIM device may decide that UE B communication is more important and decide to leave UE A connection.

In another example, the device may decide that the UE A connection is more important and perform at least one of the steps S1011 to 1019 below.

In step S1011, the UE B may perform Random Access procedure and send a NAS Service Request towards the AMF with the new cause value "busy" which indicates that the UE B/MUSIM device has received the paging message but is not able to setup the communication for UE B service (i.e., busy indication).

It is assumed that the UE can decode the paging message and respond with the busy indication within a short time.

The assumption is based on that the preparation phase before performing the Random Access has already been done when monitoring the paging occasion, and the time to execute msg1 to msg5 in the Random Access Procedure is less than 100 ms.

In step S1013, RAN B may forward the NAS Service Request message to the AMF

In step S1015, the AMF, based on the cause value "busy" in the Service Request (i.e., busy indication), may stop paging escalation and paging repetition to the UE B and inform the network node that triggered the Network Triggered Service Request procedure. The failure cause in the Namf_Communication_N1N2MessageTransfer response may indicate that the N1 transfer failed, but the UE is still reachable.

New DL data on same or other QoS Flow can trigger paging after the above mentioned N1 failure response.

In step S1017, NAS service request may be accepted with release indication to RAN in N2 layer. The accept may include a new GUTI if needed.

In step S1019, RAN may forward the NAS Service accept to the UE and release the UE.

Meanwhile, a UE may be registered to multiple networks with multiple USIMs (i.e., MUSIM UE) and the UE may have on-going service in a network (e.g., network A) and only monitor paging in another network (e.g., network B). If the UE receives a paging message including the UE ID from network B, the UE may evaluate whether to respond to the paging message, i.e. whether to establish RRC connection for services triggering the paging.

If the UE determines not to respond to the paging message due to, e.g. no urgent/important services triggering the paging or to prioritize the on-going services in network A, the UE may not establish RRC connection in network B and continue on-going services in network A. In this situation, the network B is not aware of the UE's decision of not responding to the paging message. As a consequence, the network B may keep sending paging messages to the UE and expand the paging area (tracking area of the UE) by sending the paging message over larger (tracking) area, which wastes radio resources. To prevent such waste of radio resources of sending unwanted paging messages, the UE may send a busy indication to network B to inform that the UE has received a paging message addressed to the UE but does not establish a connection with the network B. If the network B receives the busy indication, the network B can stop transmitting paging messages to the UE and hence save radio resources.

To send a busy indication to network via dedicated signaling, the UE may be required to make a RRC connection with network B. RRC connection establishment procedure may involve several subsequent procedures and result in AS/NAS signalling such as security setup, UE context fetch, RRC reconfiguration, etc. Since a busy indication is just to indicate to network that the UE will not respond to the paging message, establishing a full RRC connection with subsequent procedures merely to indicate the busy indication is inefficient in terms of signalling and UE power consumption. Furthermore, while the UE is making RRC connection with network B to send the busy indication, service interruption may occur in network A. The service interruption may last until the UE send a busy indication to the network B and release the RRC connection with the network A.

In order to minimize aforementioned service interruption and signalling overhead, it is important to send a busy indication as fast as possible and with low complexity.

According to various embodiments, the UE may be registered to multiple networks with multiple USIMs (i.e., MSUIM UE), and the UE may monitor paging occasions in a network (e.g., first network or network A) and the UE may have on-going service(s) in another network (e.g., second network or network B). If the UE receives a paging message in a paging occasion of the UE from the first network and the paging message includes an identifier of the UE, the UE may determine whether to respond to the paging message or not, based on e, g. paging cause or service information included in the (paging record) of the received paging message. If the UE determines not to respond to the paging message, triggering condition of sending a busy indication may be satisfied. If the UE determines to respond to the paging message, triggering condition of sending a busy indication is not satisfied. If the triggering condition of sending a busy indication is satisfied, the UE may send a busy indication via a random access procedure to the first network. The UE may not establish an RRC connection to send the busy indication, and hence the UE may send the busy indication in RRC_IDLE and/or RRC_INACTIVE.

The busy indication may include at least one of the following busy indication information:

- A flag indicating that the UE will not respond to the paging (i.e. no paging response flag).
- UE information that identifies the UE. The UE information in the busy indication may be the UE's UE ID included in the paging message. For instance, the UE ID may be S-TMSI. To reduce signalling overhead of including UE ID, the index of the paging records corresponding to the UE IDs in the paging message can be included as the UE information, where index 0 corresponds to the first paging record and index k corresponds to the $(k+1)^{th}$ paging record in the paging message.
- Cause of no paging response. The cause may be that the priority of the service triggering the paging is lower than the priority of the service that is being served by the second network. The cause may be that the priority of the service triggered by the paging is lower than the priority of the service that is being served by the second network.
- Cause of paging (or priority of service triggering the paging). The cause of paging may be the same information included in the paging message.
- Assistance information for re-paging. The assistance information may comprise expected busy duration. The expected busy duration may indicate the expected duration for which the UE cannot respond to the paging message and after which the UE may respond to paging.
- Credential of the UE. The credential of the UE may be used to correctly identify the UE under the possibility of the security attack. The credential information may be pre-provisioned to the UE via, e.g., NAS signalling in a secured manner. The credential information may be generated by the UE by using seed key information and the UE ID information as input and using credential-generation algorithm.

According to various embodiments, the UE may send a busy indication via random access preamble. For example, the UE may send a message 1 (RA preamble) to indicate a busy indication. In this case, the PRACH preamble may indicate that the UE will not respond to the paging. The UE may indicate to network other information related to no paging response or subsequent action. The information, such as UE information, cause of no paging response, assistance information for re-paging and/or UE credential information, may be carried in the PUSCH transmission associated with the RA preamble or in a separate PUSCH transmission.

According to various embodiments the UE may send a message A that consists of PRACH preamble and associated PUSCH transmissions to indicate a busy indication. In this case, the PRACH preamble may indicate that the UE will not respond to the paging. The UE may indicate to network other information related to no paging response or subsequent action. The information, such as UE information, cause of no paging response, assistance information for re-paging and/or UE credential information, may be carried in the associated PUSCH transmissions or in a separate PUSCH transmission.

According to various embodiments, the UE may send a busy indication via PUSCH as part of random access. For example, the UE may transmit a message 3 indicating a busy indication or a message B indicating a busy indication. In such cases, the PUSCH may indicate that the UE will not respond to the paging. For example, the RRC connection setup request, RRC connection resume request can indicate the busy indication by including a flag or a cause value in the message. A new UL message can be introduced to indicate a busy indication. The UE may indicate to network other information related to no paging response or subsequent action. The information, such as UE information, cause of no paging response, assistance information for re-paging and/or UE credential information may be carried in the PUSCH transmission or in a separate PUSCH transmission.

According to various embodiments, the UE may determine whether to send a busy indication based on network indication. For example, the UE may determine that the UE is allowed to send a busy indication to network if the network provides random access information including random access preamble for busy indication or random access occasion for busy indication or an explicit flag via broadcast or dedicated signaling. If the UE determines that the UE is not allowed to send a busy indication, the UE does not send a busy indication even if the UE determines that the UE does not respond to the paging.

Figure 11:
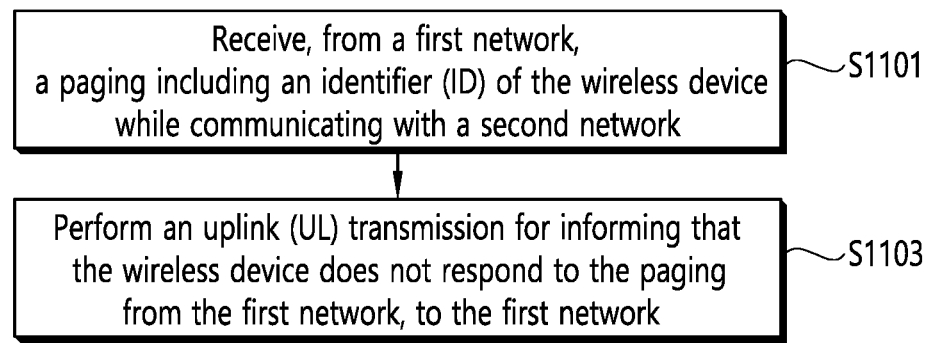
FIG. 11 shows an example of a method for transmitting a busy indication according to an embodiment of the present disclosure.

FIG. 11 shows an example of a method for transmitting a busy indication according to an embodiment of the present disclosure. Steps illustrated in FIG. 11 may be performed by a wireless device and/or a UE.

Referring to FIG. 11, in step S1101, the wireless device may receive, from a first network, a paging including an identifier (ID) of the wireless device.

In step S1103, the wireless device may perform a UL transmission for informing that the wireless device does not respond to the paging from the first network, to the first network. The UL transmission may be related to the ID of the wireless device among a list of IDs of wireless devices in the paging.

According to various embodiments, the UL transmission may comprise a random access preamble. The random access preamble may be related to the ID of the wireless device among the list of IDs of wireless devices in the paging.

According to various embodiments, the random access preamble may be determined based on an index of one or more paging records related to the ID of the wireless device in the paging.

According to various embodiments, the random access preamble may be determined based on a paging occasion in which the paging is received.

According to various embodiments, the wireless device may receive a configuration of preamble indexes for informing that the wireless device does not respond to the paging. The wireless device may determine the random access preamble having a preamble index among the preamble indexes.

According to various embodiments, the wireless device may determine the preamble index as an index of one or more paging records related to the ID of the wireless device in the paging.

According to various embodiments, the wireless device may receive mapping information informing a mapping between each of the preamble indexes and each paging occasion. The wireless device may determine, based on the mapping information, the preamble index mapped to a paging occasion in which the paging is received.

According to various embodiments, the random access preamble may be related to the ID of the wireless device among a list of IDs of wireless devices in the paging.

According to various embodiments, a timing for transmitting the random access preamble may be determined based on an index of one or more paging records related to the ID of the wireless device in the paging.

According to various embodiments, a timing for transmitting the random access preamble may be determined based on a paging occasion in which the paging is received.

According to various embodiments, the wireless device may determine not to respond to the paging from the first network based on that a priority of a service triggering or triggered by the paging from the first network is lower than that of the on-going service in the second network.

According to various embodiments, after transmitting the busy indication, the wireless device may receive a response message from the first network. The response message may include an uplink grant. The wireless device may perform a physical uplink shared channel (PUSCH) transmission based on the uplink grant. The PUSCH transmission may comprise at least one of the ID of the wireless device, a cause of no paging response for the paging, a cause of the paging, assistance information for re-paging or credentials of the wireless device.

According to various embodiments, the PUSCH transmission may be related to a radio resource control (RRC) setup request message in a RRC connection establishment procedure. The wireless device may not enter a connected mode or complete the RRC connection establishment procedure after transmitting the RRC setup request message.

According to various embodiments, the PUSCH transmission may be related to a radio resource control (RRC) resume request message in a RRC connection resume procedure. The wireless device may not enter a connected mode or complete the RRC connection resume procedure after transmitting the RRC resume request message.

According to various embodiments, the wireless device may receive, from a network, a paging message including an identifier of the UE. The wireless device may determine whether to respond to the paging message. The wireless device may send, to the network, an indication that the UE does not respond to the paging message. The indication may be transmitted during random access procedure.

According to various embodiments, the wireless device may receive, from a network, a paging message including an identifier of the UE. The wireless device may determine whether to respond to the paging message. The wireless device may send, to the network, an RRC setup request message including an indication that the UE does not respond to the paging message. The indication is included as RRC connection establishment cause value. The wireless device may receive, from the network, a RRC message as a response to the RRC setup request message. The wireless device may remain in a RRC_IDLE state.

According to various embodiments, the wireless device may receive, from a network, a paging message including an identifier of the UE on a paging occasion. The wireless device may determine whether to respond to the paging message. The wireless device may send, to the network, a PRACH preamble which indicates that the UE does not respond to the paging message. The PRACH preamble may be selected based on at least one of the paging occasion or the UE identifier. The PRACH preamble may be transmitted on a timing selected based on at least one of the paging occasion or the UE identifier.

Figure 12:
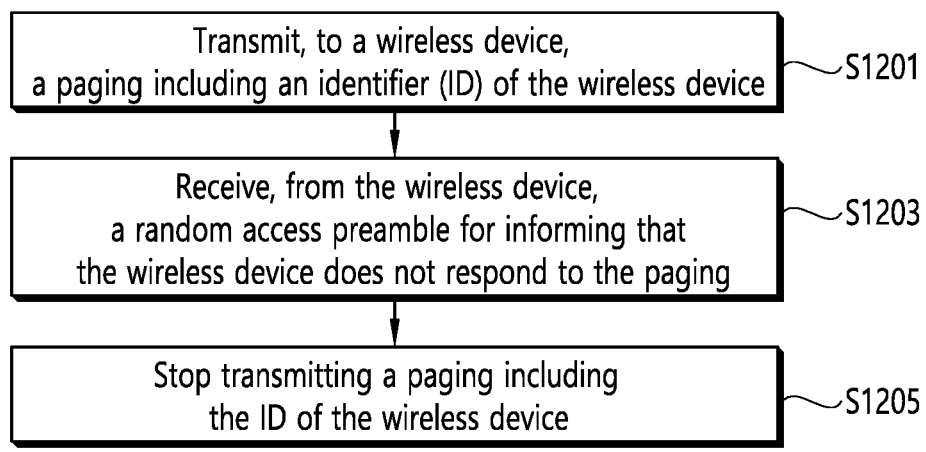
FIG. 12 shows an example of a method for receiving a busy indication according to an embodiment of the present disclosure.

FIG. 12 shows an example of a method for receiving a busy indication according to an embodiment of the present disclosure. Steps illustrated in FIG. 12 may be performed by a base station (BS) in a first network.

Referring to FIG. 12, in step S1201, the BS may transmit, to a wireless device, a paging including an identifier (ID) of the wireless device.

In step S1203, the BS may receive, from the wireless device, a random access preamble for informing that the wireless device does not respond to the paging.

In step S1205, the BS may stop transmitting a paging including the ID of the wireless device. The random access preamble may be related to the ID of the wireless device among a list of IDs of wireless devices in the paging.

The BS in FIG. 12 may be an example of a second device 220 in FIG. 2, and therefore, steps of the BS as illustrated in FIG. 12 may be implemented by the second device 220. For example, the processor 221 may be configured to control the transceiver 223 to transmit, to a wireless device, a paging including an identifier (ID) of the wireless device. The processor 221 may be configured to control the transceiver 223 to receive, from the wireless device, a random access preamble for informing that the wireless device does not respond to the paging. The processor 221 may be configured to stop transmitting a paging including the ID of the wireless device. The random access preamble may be related to the ID of the wireless device among a list of IDs of wireless devices in the paging.

Figure 13:
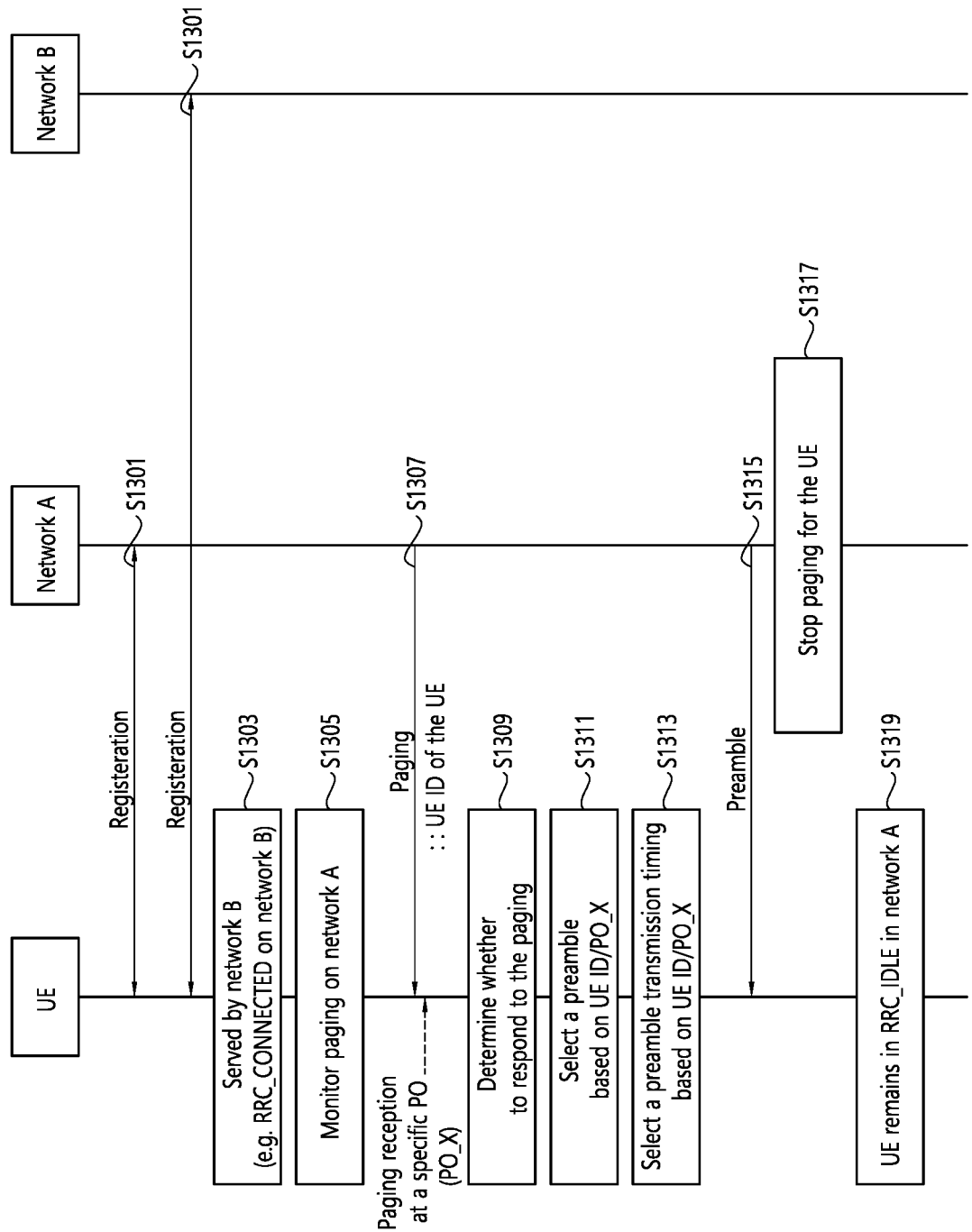
FIG. 13 shows an example of a procedure for a transmission of a busy indication via PRACH preamble according to an embodiment of the present disclosure.

FIG. 13 shows an example of a procedure for a transmission of a busy indication via PRACH preamble according to an embodiment of the present disclosure.

Referring to FIG. 13, in step S1301, the UE may register to both network A and network B.

In step S1303, the UE may be currently served by the network B. That is, the UE is in RRC_CONNECTED on the network B.

In step S1305, the UE may monitor paging on the network A.

In step S1307, the network A may transmit a paging to the UE. The paging may include UE ID. The UE may receive the paging at a specific PO (PO_X).

In step S1309, the UE may determine whether to respond to the paging from the network A. The UE may determine not to respond to the paging from the network A, upon which triggering condition of sending a busy indication is satisfied.

In step S1311, the UE may select/choose a PRACH preamble for transmitting the busy indication. The PRACH preamble may be selected/chosen based on UE ID and/or the specific PO at which the paging is received. For example, the PRACH preamble may be chosen/selected based on at least a paging occasion during which the UE receives the paging and/or UE information.

In step S1313, the UE may select/choose a PRACH preamble transmission timing for transmitting the busy indication. The PRACH preamble transmission timing may be selected/chosen based on UE ID and/or the specific PO at which the paging is received. For example, the PRACH preamble may be transmitted on a timing chosen based on at least a paging occasion during which the UE receives the paging and/or UE information.

In step S1315, the UE may transmit the PRACH preamble as the busy indication to the network A.

In step S1317, upon receiving the busy indication from the UE, the network A may stop paging the UE.

In step S1319, the UE may remain in RRC_IDLE or RRC_INACTIVE in the network A.

In the procedure for a transmission of a busy indication via PRACH preamble:
  The UE may be configured with at least one PRACH preamble resource index, where the PRACH preamble of the resource index may be used as a busy indication.
  Paging message may include the index information to associate the paging message with the PRACH preamble index. The index information may be indicated per paging record or per paging message.
  The index information may be associated with paging occasions. For instance, a specific PRACH preamble index may be associated with a specific set of paging occasions. System information may signal the association between (a set of) paging occasions and PRACH preamble index, where the UE should use the associated PRACH preamble index as busy indication for the paging message received over the associated paging occasion.

Figure 14:
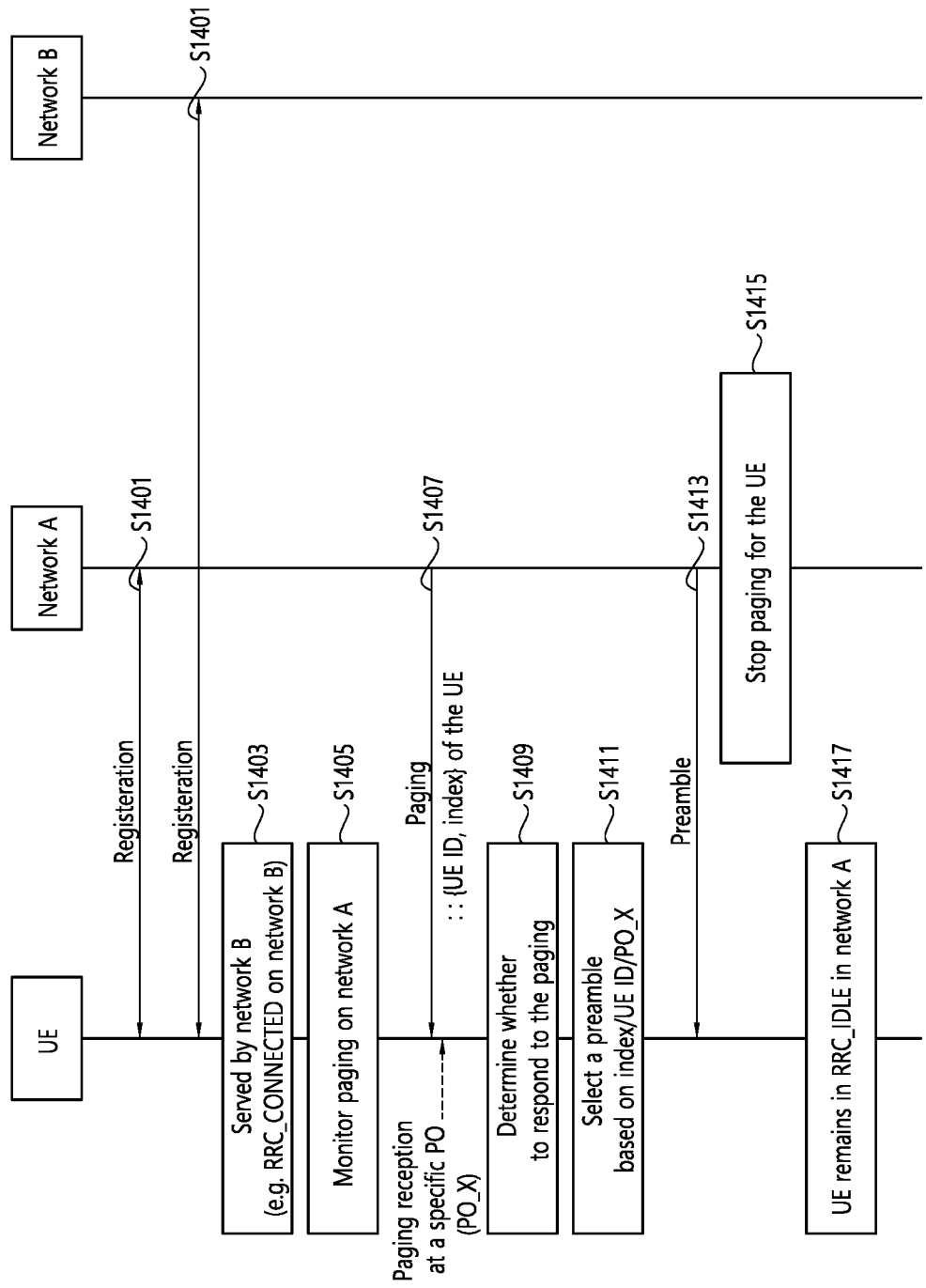
FIG. 14 shows another example of a procedure for a transmission of a busy indication via a random access preamble according to an embodiment of the present disclosure.

FIG. 14 shows another example of a procedure for a transmission of a busy indication via a random access preamble according to an embodiment of the present disclosure.

Referring to FIG. 14, in step S1401, the UE may register to both network A and network B.

In step S1403, the UE may be currently served by the network B. That is, the UE is in RRC_CONNECTED on the network B.

In step S1405, the UE may monitor paging on the network A.

In step S1407, the network A may transmit a paging to the UE. The paging may include UE ID and index information. The UE may receive the paging at a specific PO (PO_X).

In step S1409, the UE may determine whether to respond to the paging from the network A. The UE may determine not to respond to the paging from the network A, upon which triggering condition of sending a busy indication is satisfied.

In step S1411, the UE may select/choose a PRACH preamble and/or PRACH preamble transmission timing for transmitting the busy indication. The PRACH preamble and/or the PRACH preamble transmission timing may be selected/chosen based on the index information included in the paging, UE ID and/or the specific PO at which the paging is received.

For example, the PRACH preamble may be chosen/selected based on the index information included in the paging message.

For example, the PRACH preamble may be transmitted on a timing chosen based on at least a paging occasion during which the UE receives the paging and/or UE information.

In step S1413, the UE may transmit the PRACH preamble as the busy indication to the network A.

In step S1415, upon receiving the busy indication from the UE, the network A may stop paging the UE.

In step S1417, the UE may remain in RRC_IDLE or RRC_INACTIVE in the network A.

In the procedure for a transmission of a busy indication via PRACH preamble:
  The UE may be configured with at least one PRACH preamble resource index, where the PRACH preamble of the resource index may be used as a busy indication.
  Paging message may include the index information to associate the paging message with the PRACH preamble index. The index information may be indicated per paging record or per paging message.
  The index information may be associated with paging occasions. For instance, a specific PRACH preamble index may be associated with a specific set of paging occasions. System information may signal the association between (a set of) paging occasions and PRACH preamble index, where the UE should use the associated PRACH preamble index as busy indication for the paging message received over the associated paging occasion.

Figure 15:
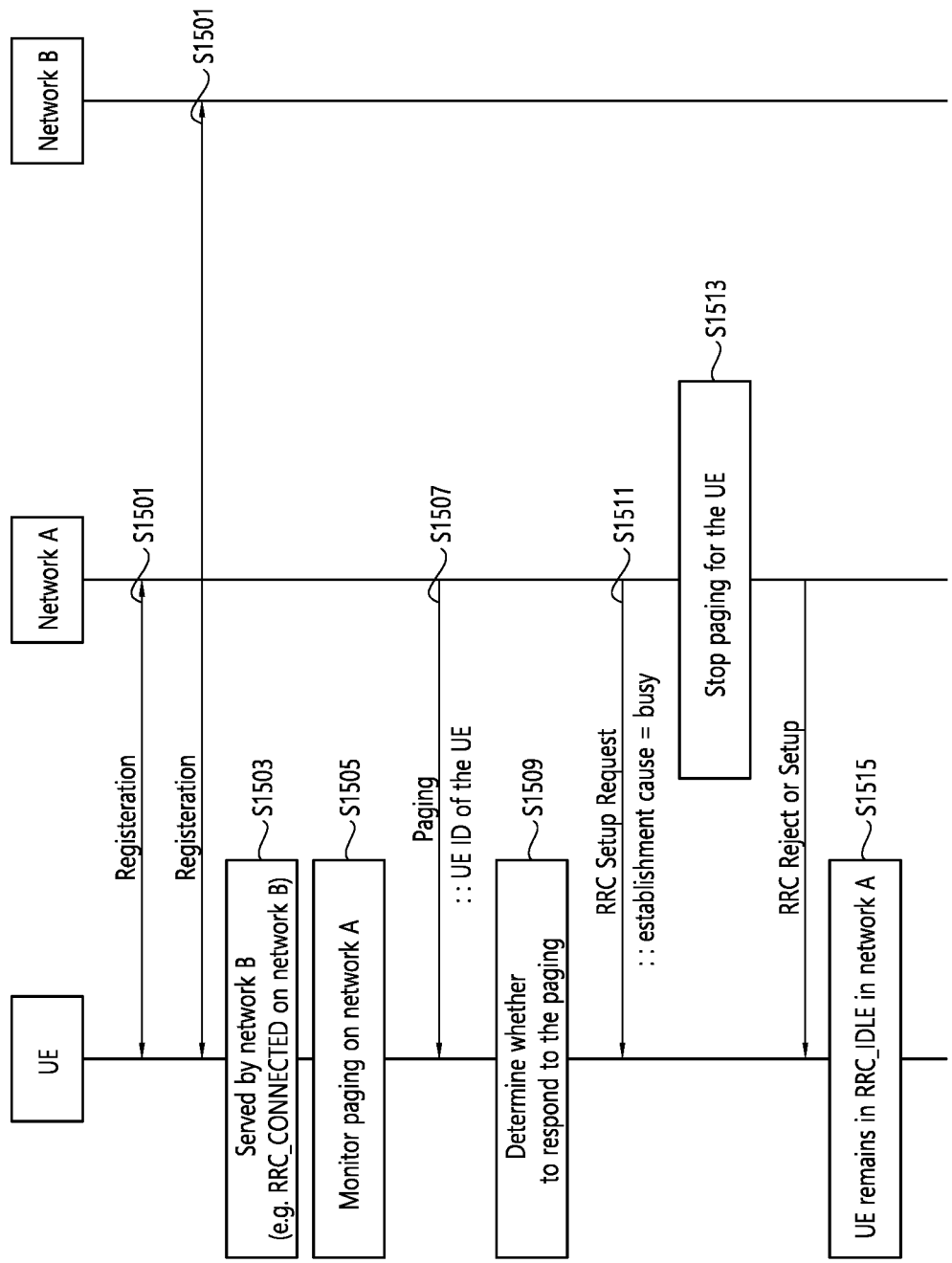
FIG. 15 shows an example of a procedure for a transmission of a busy indication via RRC setup request message according to an embodiment of the present disclosure.

FIG. 15 shows an example of a procedure for a transmission of a busy indication via RRC setup request message according to an embodiment of the present disclosure.

Referring to FIG. 15, in step S1501, the UE may register to both network A and network B.

In step S1503, the UE may be currently served by the network B. That is, the UE may be in RRC_CONNECTED on the network B.

In step S1505, the UE may monitor paging on the network A.

In step S1507, the network A may transmit a paging to the UE. The paging may include UE ID. The UE may receive the paging at a specific PO (PO_X).

In step S1509, the UE determines whether to respond to the paging from the network A. The UE may determine not to respond to the paging from the network A, upon which triggering condition of sending a busy indication is satisfied.

In step S1511, the UE may transmit an RRC Setup Request message to the network A.

The UE may send RRC setup request message including UE information and no paging response flag (i.e., busy indication). The UE may indicate the no paging response flag (i.e., busy indication) as establishment cause value. After sending the RRC setup request message including the busy indication, the UE does not enter RRC_CONNECTED but remains in RRC_IDLE.

In step S1513, upon receiving the RRC Setup request message including the establishment cause indicating the busy indication from the UE, the network A may stop paging the UE.

To enforce the UE to remain in RRC_IDLE, the UE may skip receiving RRC setup message, or the UE may receive RRC setup message but does not enter RRC connection setup/RRC_CONNECTED, i.e., does not complete RRC connection establishment procedure.

To enforce the UE to remain in RRC_IDLE, the UE may receive RRC Reject message which may include an indication that confirms reception of the busy indication by network. If the indication is included in the RRC reject message, the UE may ignore the wait time included in the RRC reject message.

In step S1515, the UE may remain in RRC_IDLE in the network A.

Figure 16:
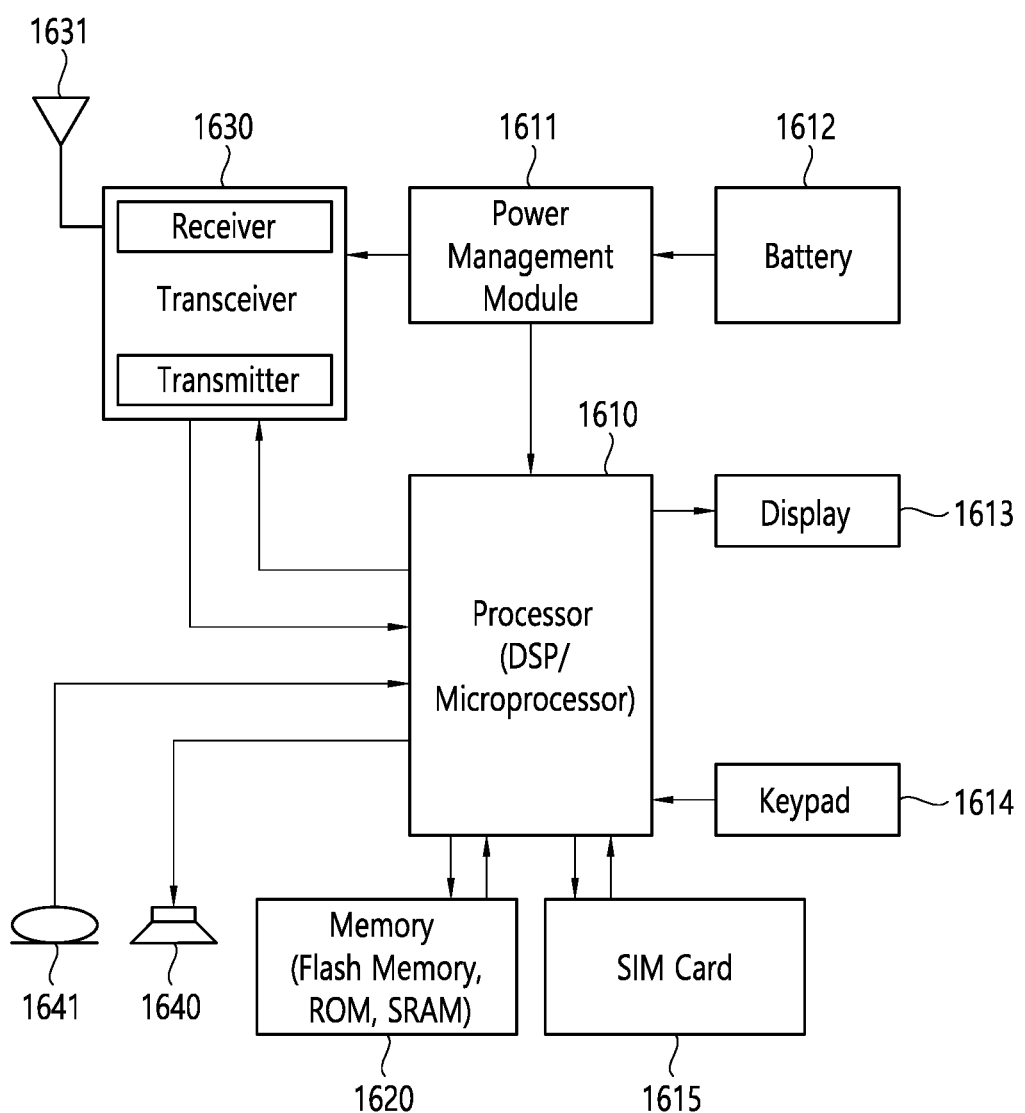
FIG. 16 shows a UE to implement an embodiment of the present disclosure. The present disclosure described above for UE side may be applied to this embodiment.

FIG. 16 shows a UE to implement an embodiment of the present disclosure. The present disclosure described above for UE side may be applied to this embodiment. The UE in FIG. 16 may be an example of first device 210 as illustrated in FIG. 2.

A UE includes a processor 1610 (i.e., processor 211), a power management module 1611, a battery 1612, a display 1613, a keypad 1616, a subscriber identification module (SIM) card 1615, a memory 1620 (i.e., memory 212), a transceiver 1630 (i.e., transceiver 213), one or more antennas 1631, a speaker 1640, and a microphone 1641.

The processor 1610 may be configured to implement proposed functions, procedures and/or methods described in this description. Layers of the radio interface protocol may be implemented in the processor 1610. The processor 1610 may include application-specific integrated circuit (ASIC), other chipset, logic circuit and/or data processing device. The processor 1610 may be an application processor (AP). The processor 1610 may include at least one of a digital signal processor (DSP), a central processing unit (CPU), a graphics processing unit (GPU), a modem (modulator and demodulator). An example of the processor 1610 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1610 may be configured to, or configured to control the transceiver 1630 to implement steps performed by the UE and/or the wireless device throughout the disclosure.

The power management module 1611 manages power for the processor 1610 and/or the transceiver 1630. The battery 1612 supplies power to the power management module 1611. The display 1613 outputs results processed by the processor 1610. The keypad 1616 receives inputs to be used by the processor 1610. The keypad 1616 may be shown on the display 1613. The SIM card 1615 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1620 is operatively coupled with the processor 1610 and stores a variety of information to operate the processor 1610. The memory 1620 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

The transceiver 1630 is operatively coupled with the processor 1610, and transmits and/or receives a radio signal. The transceiver 1630 includes a transmitter and a receiver. The transceiver 1630 may include baseband circuitry to process radio frequency signals. The transceiver 1630 controls the one or more antennas 1631 to transmit and/or receive a radio signal.

The speaker 1640 outputs sound-related results processed by the processor 1610. The microphone 1641 receives sound-related inputs to be used by the processor 1610.

According to various embodiments, the processor 1610 may be configured to, or configured to control the transceiver 1630 to implement steps performed by the UE and/or the wireless device throughout the disclosure. For example, the processor 1610 may be configured to control the transceiver 1630 to receive, from a first network, a paging including an identifier (ID) of the wireless device. The processor 1610 may be configured to control the transceiver 1630 to perform a UL transmission for informing that the wireless device does not respond to the paging from the first network, to the first network. The processor 1610 may be configured to control the transceiver 1630 to communicate with the second network after performing the UL transmission to the first network. The UL transmission may be related to the ID of the wireless device among a list of IDs of wireless devices in the paging.

According to various embodiments, the UL transmission may comprise a random access preamble. The random access preamble may be related to the ID of the wireless device among a list of IDs of wireless devices in the paging.

According to various embodiments, the random access preamble may be determined based on an index of one or more paging records related to the ID of the wireless device in the paging.

According to various embodiments, the random access preamble may be determined based on a paging occasion in which the paging is received.

According to various embodiments, the processor 1610 may be configured to control the transceiver 1630 to receive a configuration of preamble indexes for informing that the wireless device does not respond to the paging. The processor 1610 may be configured to determine the random access preamble having a preamble index among the preamble indexes.

According to various embodiments, the processor 1610 may be configured to determine the preamble index as an index of one or more paging records related to the ID of the wireless device in the paging.

According to various embodiments, the processor 1610 may be configured to control the transceiver 1630 to receive mapping information informing a mapping between each of the preamble indexes and each paging occasion. The processor 1610 may be configured to determine, based on the mapping information, the preamble index mapped to a paging occasion in which the paging is received.

According to various embodiments, the random access preamble may be related to the ID of the wireless device among a list of IDs of wireless devices in the paging.

According to various embodiments, a timing for transmitting the random access preamble may be determined based on an index of one or more paging records related to the ID of the wireless device in the paging.

According to various embodiments, a timing for transmitting the random access preamble may be determined based on a paging occasion in which the paging is received.

According to various embodiments, the processor 1610 may be configured to determine not to respond to the paging from the first network based on that a priority of a service triggering or triggered by the paging from the first network is lower than that of the on-going service in the second network.

According to various embodiments, after transmitting the random access preamble, the processor 1610 may be configured to control the transceiver 1630 to receive a random access response comprising an uplink grant from the first network. The processor 1610 may be configured to perform a physical uplink shared channel (PUSCH) transmission based on the uplink grant. The PUSCH transmission may comprise at least one of the ID of the wireless device, a cause of no paging response for the paging, a cause of the paging, assistance information for re-paging or credentials of the wireless device.

According to various embodiments, the PUSCH transmission may be related to a radio resource control (RRC) setup request message in a RRC connection establishment procedure. The wireless device may not enter a connected mode or complete the RRC connection establishment procedure after transmitting the RRC setup request message.

According to various embodiments, the PUSCH transmission may be related to a radio resource control (RRC) resume request message in a RRC connection resume procedure. The wireless device may not enter a connected mode or complete the RRC connection resume procedure after transmitting the RRC resume request message.

Figure 17:
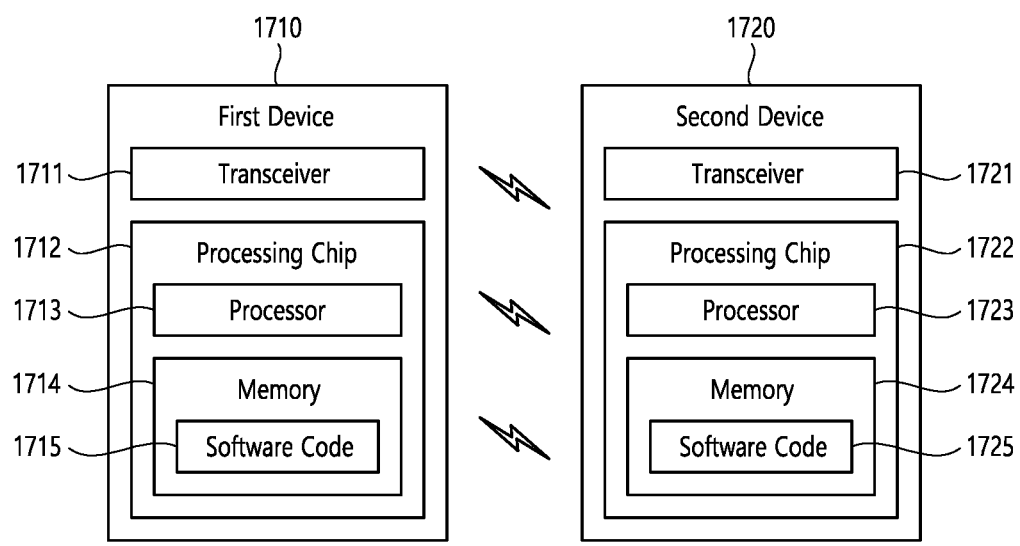
FIG. 17 shows another example of a wireless communication system to which the technical features of the present disclosure can be applied.

FIG. 17 shows another example of a wireless communication system to which the technical features of the present disclosure can be applied.

Referring to FIG. 17, the wireless communication system may include a first device 1710 (i.e., first device 210) and a second device 1720 (i.e., second device 220).

The first device 1710 may include at least one transceiver, such as a transceiver 1711, and at least one processing chip, such as a processing chip 1712. The processing chip 1712 may include at least one processor, such a processor 1713, and at least one memory, such as a memory 1717. The memory may be operably connectable to the processor 1713. The memory 1717 may store various types of information and/or instructions. The memory 1717 may store a software code 1717 which implements instructions that, when executed by the processor 1713, perform operations of the first device 910 described throughout the disclosure. For example, the software code 1717 may implement instructions that, when executed by the processor 1713, perform the functions, procedures, and/or methods of the first device 1710 described throughout the disclosure. For example, the software code 1717 may control the processor 1713 to perform one or more protocols. For example, the software code 1717 may control the processor 1713 to perform one or more layers of the radio interface protocol.

The second device 1720 may include at least one transceiver, such as a transceiver 1721, and at least one processing chip, such as a processing chip 1722. The processing chip 1722 may include at least one processor, such a processor 1723, and at least one memory, such as a memory 1724. The memory may be operably connectable to the processor 1723. The memory 1724 may store various types of information and/or instructions. The memory 1724 may store a software code 1725 which implements instructions that, when executed by the processor 1723, perform operations of the second device 1720 described throughout the disclosure. For example, the software code 1725 may implement instructions that, when executed by the processor 1723, perform the functions, procedures, and/or methods of the second device 1720 described throughout the disclosure. For example, the software code 1725 may control the processor 1723 to perform one or more protocols. For example, the software code 1725 may control the processor 1723 to perform one or more layers of the radio interface protocol.

According to various embodiments, the first device 1710 as illustrated in FIG. 17 may comprise a wireless device. The wireless device may comprise a transceiver 1711, a processing chip 1712. The processing chip 1712 may comprise a processor 1713, and a memory 1717. The memory 1717 may be operably connectable to the processor 1713. The memory 1717 may store various types of information and/or instructions. The memory 1717 may store a software code 1717 which implements instructions that, when executed by the processor 1713, perform operations comprising: receiving, from a first network, a paging including an identifier (ID) of the wireless device; and performing an uplink (UL) transmission for informing that the wireless device does not respond to the paging from the first network, to the first network. The UL transmission is related to the ID of the wireless device among a list of IDs of the wireless devices in the paging.

According to various embodiments, a non-transitory computer-readable medium has stored thereon a plurality of instructions. The plurality of instructions, when executed by a processor of a wireless device, cause the wireless device to: receive, from a first network, a paging including an identifier (ID) of the wireless device; and perform an uplink (UL) transmission for informing that the wireless device does not respond to the paging from the first network, to the first network. The UL transmission may be related to the ID of the wireless device among a list of IDs of wireless devices in the paging.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 18:
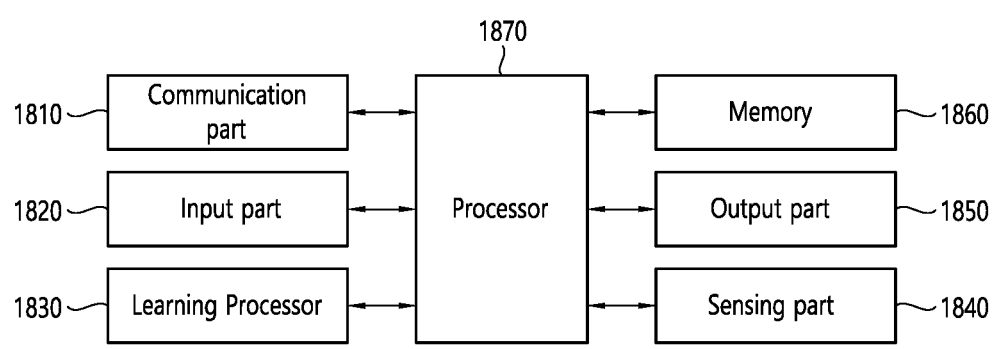
FIG. 18 shows an example of an AI device to which the technical features of the present disclosure can be applied.

FIG. 18 shows an example of an AI device to which the technical features of the present disclosure can be applied.

The AI device 1800 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 18, the AI device 1800 may include a communication part 1810, an input part 1820, a learning processor 1830, a sensing part 1840, an output part 1850, a memory 1860, and a processor 1870.

The communication part 1810 can transmit and/or receive data to and/or from external devices such as the AI devices and the AI server using wire and/or wireless communication technology. For example, the communication part 1810 can transmit and/or receive sensor information, a user input, a learning model, and a control signal with external devices. The communication technology used by the communication part 1810 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1820 can acquire various kinds of data. The input part 1820 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1820 can acquire input data to be used when acquiring an output using learning data and a learning model for model learning. The input part 1820 may obtain raw input data, in which case the processor 1870 or the learning processor 1830 may extract input features by preprocessing the input data.

The learning processor 1830 may learn a model composed of an ANN using learning data. The learned ANN can be referred to as a learning model. The learning model can be used to infer result values for new input data rather than learning data, and the inferred values can be used as a basis for determining which actions to perform. The learning processor 1830 may perform AI processing together with the learning processor of the AI server. The learning processor 1830 may include a memory integrated and/or implemented in the AI device 1800. Alternatively, the learning processor 1830 may be implemented using the memory 1860, an external memory directly coupled to the AI device 1800, and/or a memory maintained in an external device.

The sensing part 1840 may acquire at least one of internal information of the AI device 1800, environment information of the AI device 1800, and/or the user information using various sensors. The sensors included in the sensing part 1840 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1850 may generate an output related to visual, auditory, tactile, etc. The output part 1850 may include a display unit for outputting visual information, a speaker for outputting auditory information, and/or a haptic module for outputting tactile information.

The memory 1860 may store data that supports various functions of the AI device 1800. For example, the memory 1860 may store input data acquired by the input part 1820, learning data, a learning model, a learning history, etc.

The processor 1870 may determine at least one executable operation of the AI device 1800 based on information determined and/or generated using a data analysis algorithm and/or a machine learning algorithm. The processor 1870 may then control the components of the AI device 1800 to perform the determined operation. The processor 1870 may request, retrieve, receive, and/or utilize data in the learning processor 1830 and/or the memory 1860, and may control the components of the AI device 1800 to execute the predicted operation and/or the operation determined to be desirable among the at least one executable operation. The processor 1870 may generate a control signal for controlling the external device, and may transmit the generated control signal to the external device, when the external device needs to be linked to perform the determined operation. The processor 1870 may obtain the intention information for the user input and determine the user's requirements based on the obtained intention information. The processor 1870 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1830 and/or learned by the learning processor of the AI server, and/or learned by their distributed processing. The processor 1870 may collect history information including the operation contents of the AI device 1800 and/or the user's feedback on the operation, etc. The processor 1870 may store the collected history information in the memory 1860 and/or the learning processor 1830, and/or transmit to an external device such as the AI server. The collected history information can be used to update the learning model. The processor 1870 may control at least some of the components of AI device 1800 to drive an application program stored in memory 1860. Furthermore, the processor 1870 may operate two or more of the components included in the AI device 1800 in combination with each other for driving the application program.

Figure 19:
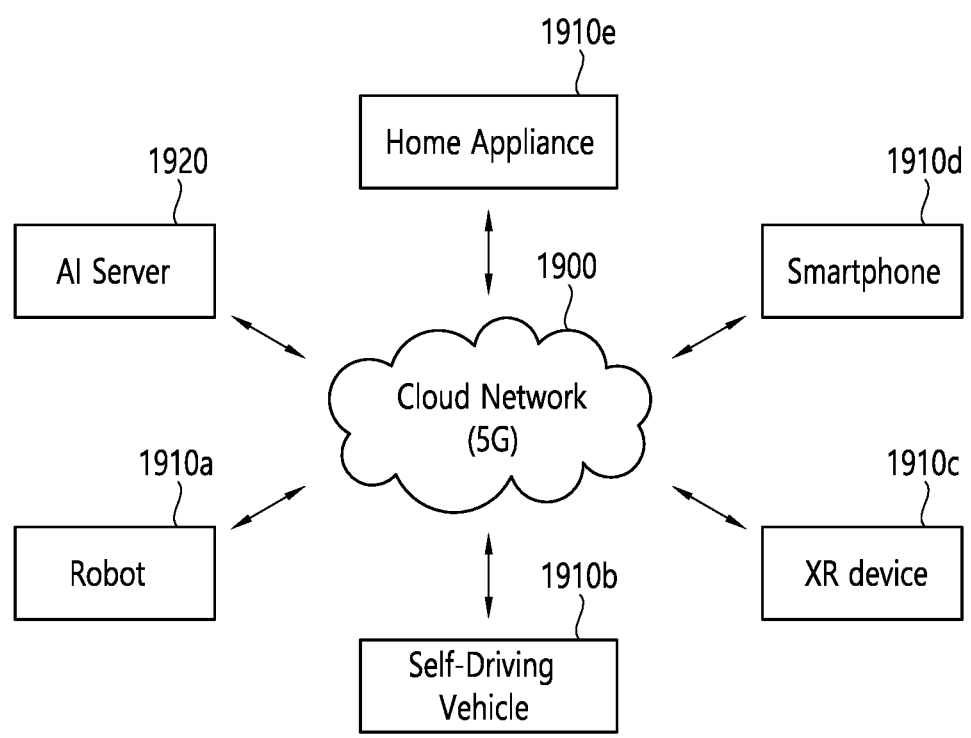
FIG. 19 shows an example of an AI system to which the technical features of the present disclosure can be applied.

FIG. 19 shows an example of an AI system to which the technical features of the present disclosure can be applied.

Referring to FIG. 19, in the AI system, at least one of an AI server 1920, a robot 1910a, an autonomous vehicle 1910b, an XR device 1910c, a smartphone 1910d and/or a home appliance 1910e is connected to a cloud network 1900. The robot 1910a, the autonomous vehicle 1910b, the XR device 1910c, the smartphone 1910d, and/or the home appliance 1910e to which the AI technology is applied may be referred to as AI devices 1910a to 1910e.

The cloud network 1900 may refer to a network that forms part of a cloud computing infrastructure and/or resides in a cloud computing infrastructure. The cloud network 1900 may be configured using a 3G network, a 4G or LTE network, and/or a 5G network. That is, each of the devices 1910a to 1910e and 1920 consisting the AI system may be connected to each other through the cloud network 1900. In particular, each of the devices 1910a to 1910e and 1920 may communicate with each other through a base station, but may directly communicate with each other without using a base station.

The AI server 1920 may include a server for performing AI processing and a server for performing operations on big data. The AI server 1920 is connected to at least one or more of AI devices constituting the AI system, i.e. the robot 1910a, the autonomous vehicle 1910b, the XR device 1910c, the smartphone 1910d and/or the home appliance 1910e through the cloud network 1900, and may assist at least some AI processing of the connected AI devices 1910a to 1910e. The AI server 1920 can learn the ANN according to the machine learning algorithm on behalf of the AI devices 1910a to 1910e, and can directly store the learning models and/or transmit them to the AI devices 1910a to 1910e. The AI server 1920 may receive the input data from the AI devices 1910a to 1910e, infer the result value with respect to the received input data using the learning model, generate a response and/or a control command based on the inferred result value, and transmit the generated data to the AI devices 1910a to 1910e. Alternatively, the AI devices 1910a to 1910e may directly infer a result value for the input data using a learning model, and generate a response and/or a control command based on the inferred result value.

Various embodiments of the AI devices 1910a to 1910e to which the technical features of the present disclosure can be applied will be described. The AI devices 1910a to 1910e shown in FIG. 19 can be seen as specific embodiments of the AI device 1800 shown in FIG. 18.

The present disclosure can have various advantageous effects.

For example, the busy indication indicating that the UE determines not to respond to the paging message can be transmitted as fast as possible with low complexity, without service interruption and/or signalling overhead.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
   receiving, from a first network, a paging including an identifier (ID) of the wireless device while communicating with a second network; and
   performing an uplink (UL) transmission for informing that the wireless device does not respond to the paging from the first network, to the first network,
   wherein the UL transmission is related to the ID of the wireless device among a list of IDs of the wireless devices in the paging.

2. The method of claim 1, wherein the UL transmission comprises a random access preamble, and
   wherein the random access preamble is related to the ID of the wireless device among the list of IDs of wireless devices in the paging.

3. The method of claim 2, wherein the random access preamble is determined based on an index of one or more paging records related to the ID of the wireless device in the paging.

4. The method of claim 2, wherein the random access preamble is determined based on a paging occasion in which the paging is received.

5. The method of claim 2, further comprising:
   receiving a configuration of preamble indexes for informing that the wireless device does not respond to the paging; and
   determining the random access preamble having a preamble index among the preamble indexes.

6. The method of claim 5, further comprising:
   determining the preamble index as an index of one or more paging records related to the ID of the wireless device in the paging.

7. The method of claim 5, further comprising:
   receiving mapping information informing a mapping between each of the preamble indexes and each paging occasion; and
   determining, based on the mapping information, the preamble index mapped to a paging occasion in which the paging is received.

8. The method of claim 2, wherein the random access preamble is related to the ID of the wireless device among a list of IDs of wireless devices in the paging.

9. The method of claim 2, wherein a timing for transmitting the random access preamble is determined based on an index of one or more paging records related to the ID of the wireless device in the paging.

10. The method of claim 2, wherein a timing for transmitting the random access preamble is determined based on a paging occasion in which the paging is received.

11. The method of claim 1, further comprising:
    determining not to respond to the paging from the first network based on that a priority of a service triggering or triggered by the paging from the first network is lower than that of the on-going service in the second network.

12. The method of claim 2, further comprising:
    after transmitting the random access preamble, receiving a random access response comprising an uplink grant from the first network; and performing a physical uplink shared channel (PUSCH) transmission based on the uplink grant, wherein the PUSCH transmission comprises at least one of the ID of the wireless device, a cause of no paging response for the paging, a cause of the paging, assistance information for re-paging or credentials of the wireless device.

13. The method of claim 12, wherein the PUSCH transmission is related to a radio resource control (RRC) setup request message in a RRC connection establishment procedure, and wherein the wireless device does not enter a connected mode or complete the RRC connection establishment procedure after transmitting the RRC setup request message.

14. The method of claim 12, wherein the PUSCH transmission is related to a radio resource control (RRC) resume request message in a RRC connection resume procedure, and wherein the wireless device does not enter a connected mode or complete the RRC connection resume procedure after transmitting the RRC resume request message.

15. The method of claim 1, further comprising:

communicating with the second network after performing the UL transmission to the first network.

16. The method of claim 1, wherein the wireless device is in communication with at least one of a user equipment, a network, or autonomous vehicles other than the wireless device.

17. A wireless device in a wireless communication system comprising:

a transceiver;

a memory; and at least one processor operatively coupled to the transceiver and the memory, and configured to:

control the transceiver to receive, from a first network, a paging including an identifier (ID) of the wireless device; and control the transceiver to perform an uplink (UL) transmission for informing that the wireless device does not respond to the paging from the first network, to the first network, wherein the UL transmission is related to the ID of the wireless device among a list of IDs of the wireless devices in the paging.

18. A method performed by a base station (BS) in a first network in a wireless communication system, the method comprising:

transmitting, to a wireless device, a paging including an identifier (ID) of the wireless device;

receiving, from the wireless device, a random access preamble for informing that the wireless device does not respond to the paging; and stopping transmitting a paging including the ID of the wireless device, wherein the random access preamble is related to the ID of the wireless device among a list of IDs of wireless devices in the paging.

* * * * *